United States Patent
Dobler et al.

(10) Patent No.: US 6,749,326 B2
(45) Date of Patent: Jun. 15, 2004

(54) HEADLIGHT, IN PARTICULAR FOR A MOTOR VEHICLE

(75) Inventors: Karl-Otto Dobler, Reutlingen (DE); Klaus Nagel, Reutlingen (DE); Hans-J. Schmidt, Insslingen (DE); Wolfgang Krieg, Reutlingen (DE); Harry Hoffmann, Grafenau (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 44 days.

(21) Appl. No.: 10/176,450

(22) Filed: Jun. 20, 2002

(65) Prior Publication Data
US 2002/0196640 A1 Dec. 26, 2002

(30) Foreign Application Priority Data
Jun. 21, 2001 (DE) .......................................... 101 29 968

(51) Int. Cl.[7] ............................................. B60Q 1/068
(52) U.S. Cl. ....................... 362/523; 362/273; 362/289; 362/538
(58) Field of Search ................................ 362/528, 273, 362/523, 289, 538, 529, 512, 507, 422, 459, 285, 269, 429

(56) References Cited

U.S. PATENT DOCUMENTS 5,063,481 A * 11/1991 Martin ........................ 362/528

* cited by examiner

Primary Examiner—Sandra O'Shea
Assistant Examiner—Bao Q. Truong
(74) Attorney, Agent, or Firm—Michael J. Striker

(57) ABSTRACT

A headlight for a motor vehicle, having a light module, at least one reflector, the module having at least one holding frame which is turnable about two axes extending substantially perpendicularly to one another in a plan parallel to a light outlet plan of the light module, the axis intersecting one another and having an intersecting point located inside the light module.

5 Claims, 3 Drawing Sheets

HEADLIGHT, IN PARTICULAR FOR A MOTOR VEHICLE

BACKGROUND OF THE INVENTION

The present invention relates to a headlight for a motor vehicle, including a light module as well as least one reflector.

Such light modules are formed, for example, as modules in accordance with a litronic system, with a gas discharge lamp as a central component. Basically, other light modules are also possible. When the light module is formed as a litronic PES module, the light module has a projection device, a reflection device, as well as a light source.

For height and side adjustment of such a headlight, two alternatives are known. For the independent adjustment, in accordance with the prior art in lateral and upper and lower light module a fixed bearing is provided, and height and side adjustments are performed on corresponding separate adjusting elements. For the dependent adjustment, to the contrary, the height adjustment is performed by a simultaneous actuation of the height and side adjusting device, while the side adjustment is provided by actuation of the side adjusting element. With this solution it is not practical that two adjusting elements must be actuated.

Also, in such headlights there are problems with the dynamic loading, as well as with the gap dimensions in the headlight.

SUMMARY OF THE INVENTION

Accordingly, it is an object of the present invention to provide a headlight with smaller or covered gaps, wherein simultaneously the dynamic loading must be improved.

It is also an object of the present invention to provide an improvement of the hysteresis.

In keeping with these objects and with others which will become apparent hereinafter, one feature of the present invention resides, briefly stated, in a headlight, in particular for a motor vehicle, which has a light module and at least one reflector, wherein the light module is connected with a holding frame and the holding frame is turnable about two axes which are perpendicular to one another and extend in a plane parallel to a light outlet plane of the light module, wherein the intersecting point of the axes is located inside the light module.

When the headlight is designed in accordance with the present invention, the position of the both rotary axes which are perpendicular to one another realizes a cardan principle. The pivot point of the light module itself is located in the intersecting point of the both axes.

It can be further provided that the holding frame is supported rotatably in an adjusting frame, and the bearing points of the adjusting frame are located in a headlight housing.

With the use of the cardan principle it is possible to arrange the bearing points for the adjusting frame so that, for the adjustment the best possible pivot point can be provided.

The light module can include a projection lens. In particular, this is implemented when the light module is formed as a PES headlight and also a litronic system.

The rotary point which is located in the intersection of the two axes can be also located in the center of gravity of the light module, and also in the axis center point of the lense, or in other words in the center point of the lens radius, or it can be located in any intermediate position. With this arrangement of the axes both the dynamic loading as well as the gap dimension in the headlight can achieve best results.

When the pivot point is located in the center point of the lens radius, the idealized lens cone rotates around itself, and not covers a lateral path. The height in the side adjustment of the side module can be performed by adjusting screws.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
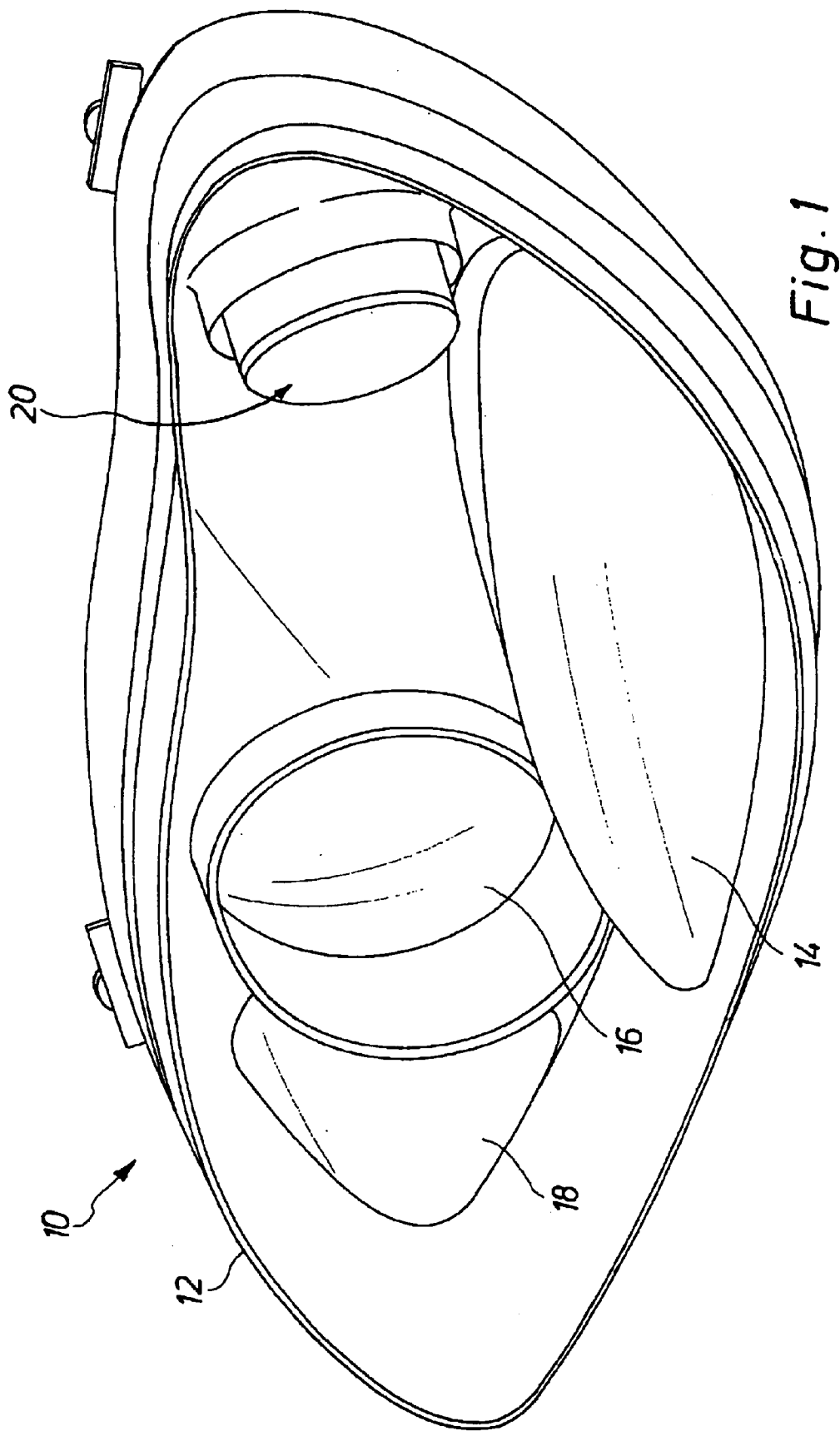
FIG. 1 is a view showing a headlight in accordance with the present invention.

A headlight in accordance with the present invention is shown in FIG. 1 and identified as a whole with reference numeral 10. The headlight 10 is however shown in a cutout, in particular for example without a dispersion disc.

The headlight 10 has a frame 12 composed of a synthetic plastic. Furthermore, it includes three reflectors 14, 16, 18 and a light module 20. The light module 20 is sealed by a not shown seal against the frame 12. The light module can be a PS litronic system. The light module 20 is turnable in the headlight 10. The turning is illustrated more clearly in FIG. 2.

Figure 2:
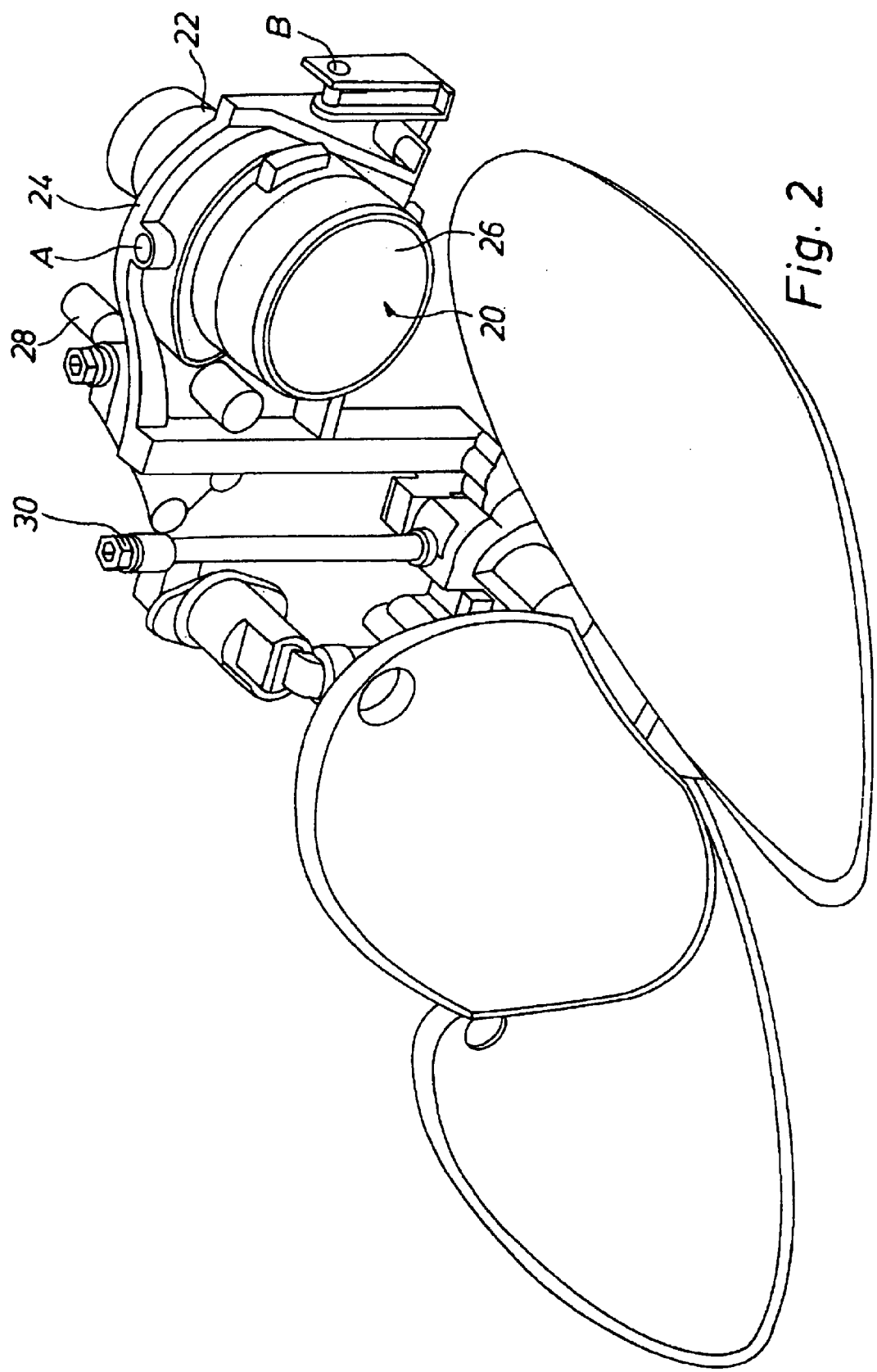
FIG. 2 is a view showing a section of the inventive headlight of FIG. 1.

FIG. 2 shows a headlight 10 of FIG. 1, however without the frame 12. The drawing shows the suspension and holding of the light module 20. The light module 20 is fixedly arranged in a holding frame 22. The holding frame 22 is rotatably supported in an adjusting frame 24.

The holding frame 22 can be therefore turnable about two axis A and B. The intersection point of these two axis which are located perpendicular to one another and materialize therefore a cardan principle, are located in a plane which is parallel to the light outlet surface 26. The actual pivot point of the light module 20 in the holding frame 22 is located in the point of intersection of the axes A and B. The intersecting point is located inside the light module 20. Thereby the gap dimension and the dynamic loading are prevented in an advantageous manner.

The adjusting frame 24 is supported in a not shown headlight housing. The adjustment of the light module can be performed by adjusting screws 28 for the side adjustment and 30 for the height adjustment.

Figure 3:
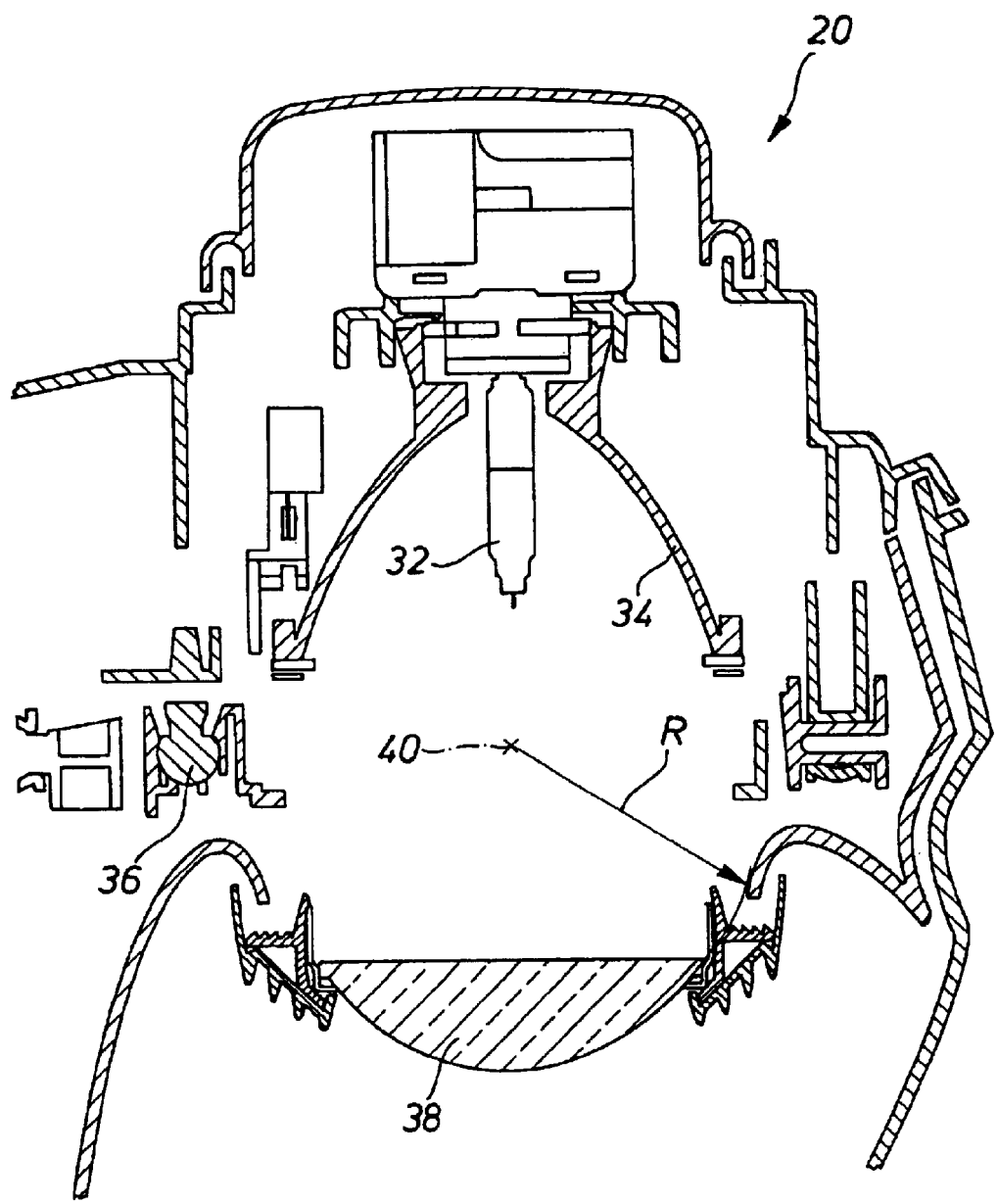
FIG. 3 is a view showing a section taken through a light module of the inventive headlight.

FIG. 3 shows the light module 20 in a schematic view. As can be seen from the drawing, the light module has the light source 32 and the reflector 34. Moreover, the light module 20 has a holding device 36 for a screen for producing the light-dark transition. The light module 20 which is illustrated here is a projection module which includes a lens 38. The lens 38 is a section of a sphere with a radius R. The center point of the sphere is identified with reference number 40.

The pivot point of the axes A and B extends through the center point 40 of the lens. Therefore by rotating or turning the light module 20, the lens 38 is rotated around its own center point 40. Thereby the dynamic loading in the light module 20 can be maintained low.

During an adjustment, the lens 38 does not perform a significant lateral path. Finally, in this way also the gap and in particular the gap dimension in the headlight is reduced.

It will be understood that each of the elements described above, or two or more together, may also find a useful application in other types of constructions differing from the types described above.

While the invention has been illustrated and described as embodied in headlight, in particular for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a motor vehicle, comprising a light module; at least one reflector, said module having at least one holding frame which is turnable about two axes extending substantially perpendicularly to one another in a plane parallel to a light outlet plane of the light module, said axis intersecting one another and having an intersecting point located inside the light module, and an adjusting frame, said holding frame being rotatably supported in said adjusting frame, said adjusting frame having bearing point located in a headlight housing.

2. A headlight as defined in claim 1; and further comprising a projection lens.

3. A headlight as defined in claim 2, wherein said lens has a radius, said intersecting point of said axes being located in a center point of said lens.

4. A headlight as defined in claim 1, wherein said light module has a center of gravity, said intersecting point of said axes being located in said center of gravity.

5. A headlight as defined in claim 1; and further comprising adjusting screws operative for height and side adjustment of said light module.

* * * * *